(12) United States Patent
Takaku

(10) Patent No.: US 6,505,132 B1
(45) Date of Patent: Jan. 7, 2003

(54) HIGH-PRECISION INSTANTANEOUSLY GENERATED TORQUE DETECTION DEVICE FOR THREE-PHASE MOTOR

(76) Inventor: Kaneo Takaku, 689-7, Shimoakasaka, Kawagoe City, Saitama Pref. (JP)

(*) Notice: Subject to any disclaimer, the term of this patent is extended or adjusted under 35 U.S.C. 154(b) by 338 days.

(21) Appl. No.: 09/584,017

(22) Filed: May 30, 2000

(30) Foreign Application Priority Data

Dec. 27, 1999 (JP) .......................................... 11-369267

(51) Int. Cl.[7] .............................................. G05B 19/40
(52) U.S. Cl. ...................................... 702/65; 318/431
(58) Field of Search ............................... 702/65, 33.41, 702/44, 60, 64; 318/431, 432, 433, 434; 73/1.09, 1.11, 862.08, 862.23, 862.191, 862.193

(56) References Cited

U.S. PATENT DOCUMENTS

| | | | | |
|---|---|---|---|---|
| 3,791,473 A | * | 2/1974 | Rosen ........................ | 180/65.2 |
| 4,169,372 A | * | 10/1979 | Colwill et al. ............ | 73/862.18 |
| 4,204,425 A | * | 5/1980 | Mallick, Jr. ................ | 322/99 |
| 4,785,675 A | * | 11/1988 | Takasu et al. ......... | 73/862.324 |
| 4,874,053 A | * | 10/1989 | Kimura et al. .............. | 180/443 |
| 5,057,760 A | * | 10/1991 | Dadpey et al. ............. | 318/807 |
| 5,334,923 A | * | 8/1994 | Lorenz et al. .............. | 318/805 |
| 6,150,788 A | * | 11/2000 | Someya ....................... | 318/439 |
| 6,332,352 B1 | * | 12/2001 | Sano .......................... | 73/117.3 |

* cited by examiner

Primary Examiner—Marc S. Hoff
Assistant Examiner—Edward Raymond
(74) Attorney, Agent, or Firm—Klarquist Sparkman, LLP

(57) ABSTRACT

A detection device being capable of detecting a high-precision instantaneously generated torque and a high-precision average generated torque of a three-phase motor is provided. The detection device includes a calculator in which, before an instantaneously generated torque is calculated from the instantaneous values of applied voltages and currents of the three-phase motor, a no-load current which is not contributed to the torque is detected in advance, and the instantaneous value of the no-load current is subtracted from an instantaneous current detected from the three-phase motor in a drive state, and a high-precision instantaneously generated torque is calculated, or includes a calculator in which an instantaneous no-load loss torque corresponding to the no-load current is calculated, the no-load loss torque is subtracted from the value of an instantaneously generated torque calculated from the instantaneous values of the applied voltage and the current detected from the three-phase motor in the drive state, and a high-precision instantaneously generated torque is calculated. Also, a no-load loss average torque with respect to time is calculated from the instantaneous no-load loss torque, and a high-precision average generated torque can be detected in consideration of the average loss torque in the no-load state.

8 Claims, 6 Drawing Sheets

HIGH-PRECISION INSTANTANEOUSLY GENERATED TORQUE DETECTION DEVICE FOR THREE-PHASE MOTOR

BACKGROUND OF THE INVENTION

1. Field of the Invention

The present invention relates to a high-precision instantaneously generated torque detection device for a three-phase motor. The three-phase motors include three-phase motors such as a three-phase induction motor, a three-phase synchronous motor, a three-phase synchronous induction motor, a brushless DC motor, an AC servo motor, a PM type motor, a three-phase reluctance motor, a permanent magnet type synchronous motor, a surface permanent magnet synchronous motor (SPM motor), an interior permanent magnet synchronous motor (IPM motor), a permanent magnet type induction motor, and a permanent magnet type synchronous induction motor.

2. Description of the Related Art

An instantaneously generated torque measurement device for a three-phase induction motor described in Japanese Examined Patent Publications No. 2591901 and No. 2619168 which are known at present, a torque is calculated from an applied voltage and a current. However, since not only a current which is contributed to a torque but also a current including a no-load current which is not contributed to a torque are detected in current detection, the torque is not precisely calculated.

SUMMARY OF THE INVENTION

According to the present invention, there is provided a detection device having the following configuration. Before an instantaneously generated torque is calculated from the instantaneous values of an applied voltage and a current of a three-phase motor, a no-load current which is not contributed to the torque is detected in advance, the instantaneous value of the no-load current is subtracted from an instantaneous current detected from the three-phase motor in a drive state to calculate a high-precision instantaneously generated torque, or a no-load current which is not contributed to the torque is detected in advance before the instantaneously generated torque is calculated from the instantaneous values of the applied voltage and the current of the three-phase motor, an instantaneous no-load loss torque corresponding to the no-load current is calculated, the no-load loss torque is subtracted from the value of the instantaneously generated torque calculated from the instantaneous values of the applied voltage and the current of the three-phase motor in the drive state, so that a high-precision instantaneously generated torque and an average generated torque of the three-phase motor can be detected.

A device according to the present invention comprises a calculator for detecting a no-load current which is not contributed to a torque in advance before an instantaneously generated torque is calculated from instantaneous values of an applied voltage and a current of a three-phase motor, subtracting an instantaneous value of the no-load current from an instantaneous current detected from the three-phase motor in a drive state, and calculating a high-precision instantaneously generated torque, or a calculator for detecting a no-load current which is not contributed to a torque in advance before an instantaneously generated torque is calculated from instantaneous values of an applied voltage and a current of a three-phase motor, calculating an instantaneous no-load loss torque corresponding to the no-load current, subtracting the no-load loss torque from the value of the instantaneously generated torque calculated from instantaneous values of the applied voltage and the current detected from the three-phase motor in a drive state, and calculating a high-precision instantaneously generated torque.

In the present invention, before an instantaneously generated torque is calculated from the instantaneous values of the applied voltage and the current of the three-phase motor, an instantaneous current in a no-load state is stored in advance, or calculation and storage of an instantaneous loss torque in a no-load state are performed. Calculation and storage of an average torque related to time are performed on the basis of the instantaneous loss torque in the no-load state, the stored no-load current or the instantaneous loss torque in the no-load state are considered when the instantaneously generated torque is calculated from the voltage and the current of the three-phase motor in a drive state, so that a high-precision instantaneously generated torque can be detected. A high-precision average torque can also be detected in consideration of the average torque in the no-load state.

DESCRIPTION OF THE PREFERRED EMBODIMENTS

Embodiments of the present invention will be described below with reference to the accompanying drawings.

Figure 1:
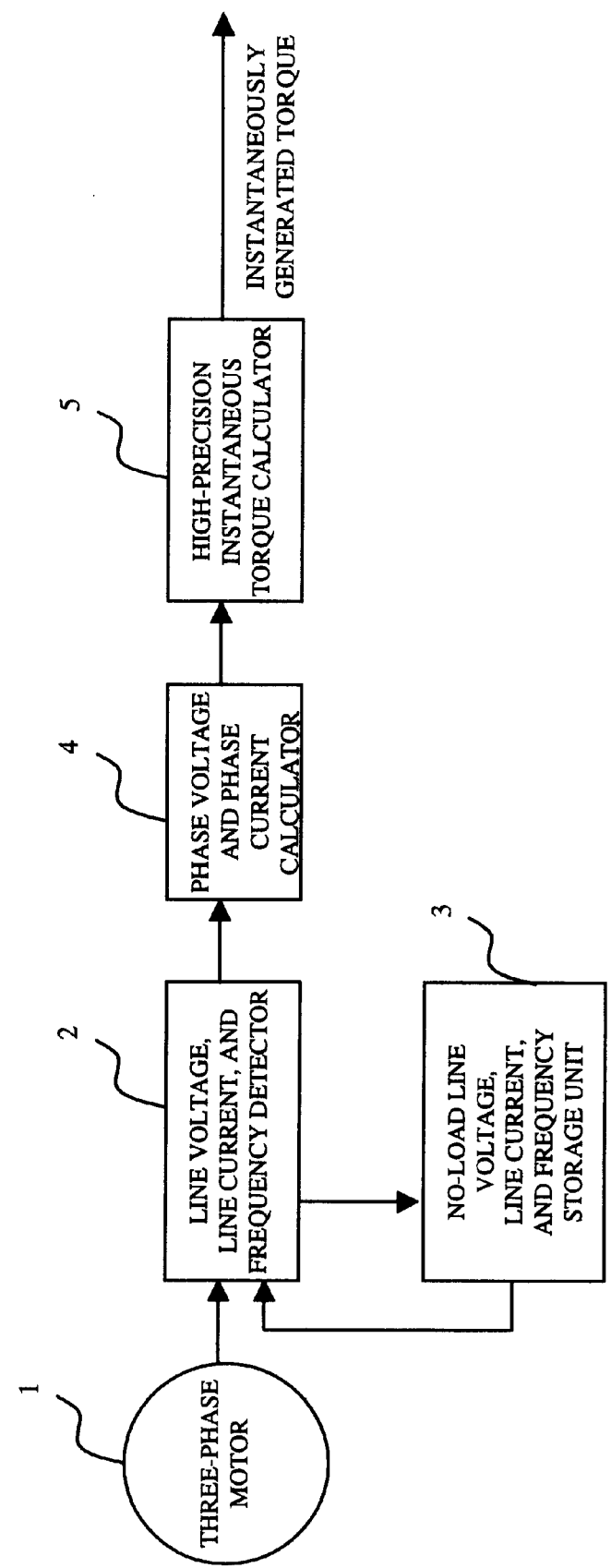
FIG. 1 is a diagram showing an embodiment of a high-precision instantaneously generated torque detection device for a three-phase motor according to a fourth aspect of the present invention.

FIG. 1 is a diagram according to fourth aspect of the present invention. In FIG. 1, instantaneous values of line voltages and line currents of terminals of a three-phase motor 1 and a power supply frequency are detected by a "line voltage, line current, and frequency detector" 2. First, instantaneous values of line voltages in a no-load state and line currents in the no-load state and a power supply frequency are detected by the "line voltage, line current, and frequency detector" 2, and are stored in a "no-load line voltage, line current, and frequency storage unit" 3. The "line voltage, line current, and frequency detector" 2 has not only the detection function but also the following functions.

More specifically, the "line voltage, line current, and frequency detector" 2 also has the function of searching the "no-load line voltage, line current, and frequency storage unit" 3 in which data of line currents related to the line voltages in the no-load state and the power supply frequency are stored for instantaneous line currents in the no-load state corresponding to frequency equals to those of the equal line voltages of the three-phase motor in a drive state, and the function of subtracting the instantaneous line currents in the no-load state searched through the "no-load line voltage, line current, and frequency storage unit" 3 from the instantaneous line currents of the three-phase motor in the drive state detected by the "line voltage, line current, and frequency detector" 2.

A "phase voltage and phase current calculator" 4 is a calculator for converting, of the instantaneous line voltage and the instantaneous line currents from the "line voltage, line current, and frequency detector" 2, the line voltages into instantaneous values of phase voltages when the stator winding of the three-phase motor has a star connection, and the line currents into instantaneous values of phase currents when the stator winding of the three-phase motor has a delta connection. A "high-precision instantaneous torque calculator" 5 is a calculator for calculating a torque from the phase voltages and phase currents calculated by the "phase voltage and phase current calculator" 4, and uses, e.g., the following equations.

In this case, in torque operation expressions, phase voltages of a stator winding constituted by a star connection and a delta connection are represented by $V_a$, $V_b$, and $V_c$, respectively, and phase currents of the stator winding are represented by $I_a$, $I_b$, and $I_c$, respectively.

An instantaneously generated torque $\tau$ can be calculated on the basis of two-phase stator fluxes on $\alpha$ and $\beta$ axes:

$$\Psi_\alpha, \Psi_\beta \quad \text{[Exogenous Variable 1]}$$

and, two-phase stator currents on $\alpha$ and $\beta$ axes:

$$I_\alpha, I_\beta \quad \text{[Exogenous Variable 2]}$$

by equation (1):
[Equation 1]

$$\tau = n(\Psi_\alpha \cdot I_\beta - \Psi_\beta \cdot I_\alpha) \tag{1}$$

where n represents number of pole pains.

[Exogenous Variable 2] and [Exogenous Variable 1] can be calculated by the following equations:
[Equation 2]

$$I_\alpha = K_1(I_a - 0.5I_b - 0.5I_c)$$

$$I_\beta = K_2(I_b - I_c)$$

$$\Psi_\alpha = K_1(\Psi_a - 0.5\Psi_b - 0.5\Psi_c)$$

$$\Psi_\beta = K_2(\Psi_b - \Psi_c) \tag{2}$$

where $\Psi_a$, $\Psi_b$, and $\Psi_c$ represent flux linkages of stator windings a, b, and c, respectively. $K_1$ and $K_2$ are given by $K_1 = (2/3)^{1/2}$ and $K_2 = \frac{1}{2}^{1/2}$.

Since a zero-sequence current and a zero-sequence flux do not exist when the three-phase motor is normally operated, the variables can be calculated from the following equations (3):
[Equation 3]

$$I_\alpha = K_3 I_a$$

$$I_\beta = K_2 I_a + K_4 I_b$$

$$\Psi_\alpha = K_3 \Psi_a$$

$$\Psi_\beta = K_2 \Psi_a + K_4 \Psi_b \tag{3}$$

where $K_3$ and $K_4$ are given by $K_3 = (3/2)^{1/2}$ and $K_4 = 2^{1/2}$.

As a method of detecting the three phase stator fluxes $\Psi_a$, $\Psi_b$, and $\Psi_c$, a method for using sensing coil, Hall element, or the like and a method of detecting phase voltages and phase currents of the stator winding of the three-phase motor and calculates the following equation (4) to calculate the three phase stator fluxes.
[Equation 4]

$$\Psi_a = \int (V_a - RI_a)dt$$

$$\Psi_b = \int (V_b - RI_b)dt$$

$$\Psi_c = \int (V_c - RI_c)dt \tag{4}$$

where R represents the phase resistance of the stator winding.

The instantaneously generated torque can be calculated by equation (5)
[Equation 5]

$$\tau = K_5[\Psi_a(I_b - I_c) + \Psi_b(I_c - I_a) + \Psi_c(I_a - I_b)] \tag{5}$$

where $K_5$ is given by $K_5 = n3^{-1/2}$.

Since a zero-sequence current and a zero-sequence flux do not exist when the three-phase motor is normally operated, an instantaneously generated torque can be calculated from the following equation (6). More specifically, the torque can be calculated from a-phase and b-phase flexes and currents of the stator winding of the three-phase motor.
[Equation 6]

$$\tau = K_6[\Psi_a I_b - \Psi_b I_a] \tag{6}$$

where $K_6$ is given by $K_6 = 3^{1/2}n$.

A method of calculating a high-precision instantaneously generated torque of a three-phase motor described in the fourth aspect will be described below.

Instantaneous line currents in the no-load state corresponding to frequencies which are equal to those of the equal voltages of the three-phase motor in a drive state are searched through the "no-load line voltage, line current, and frequency storage unit" 3 in which data of line currents related to the line voltages and the frequencies in the no-load state are stored, and the instantaneous line currents in the no-load state searched through the "no-load line voltage, line current, and frequency storage unit" 3 are subtracted from the instantaneous line currents of the three-phase motor in the drive state detected by the "line voltage, line current, and frequency detector" 2. The line currents subject to subtraction and line voltages obtained at the line currents are input to the "phase voltage and phase current calculator" 4. Calculation is performed by the "phase voltage and phase current calculator" 4 to convert the line voltages and the line currents into phase voltages and phase currents. From the calculated phase voltages and the calculated phase currents, an instantaneous torque is calculated by one of equation (1), equation (5), and equation (6) by means of the torque calculator serving as the "high-precision instantaneous torque calculator" 5 to calculate a high-precision instantaneously generated torque.

Figure 2:
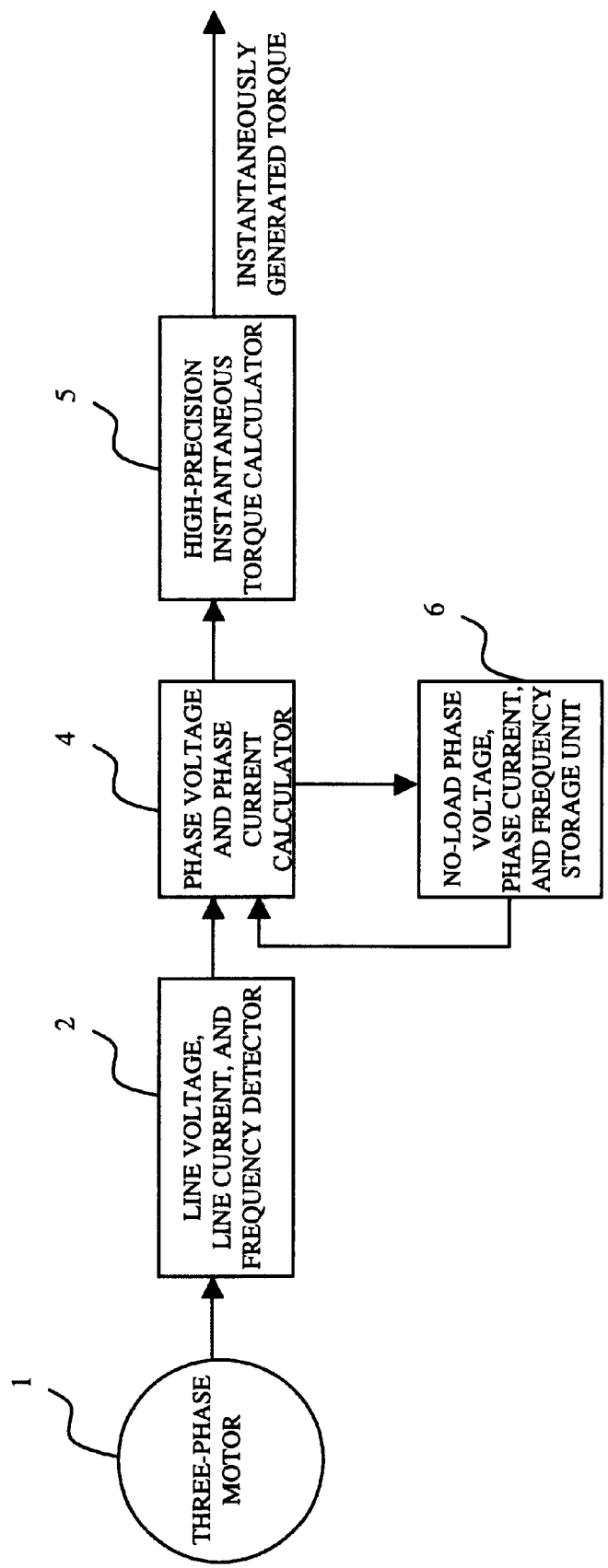
FIG. 2 is a diagram showing an embodiment of a high-precision instantaneously generated torque detection device for a three-phase motor according to a fifth aspect of the present invention.

FIG. 2 is a diagram according to a fifth aspect of the present invention. The instantaneous values of the line voltages and the line currents of the terminals of a three-phase motor 1 and a power supply frequency are detected by the "line voltage, line current, and frequency detector" 2.

The "phase voltage and phase current calculator" 4 is a calculator for converting, of the instantaneous line voltages and the instantaneous line currents from the "line voltage, line current, and frequency detector" 2, the line voltages into instantaneous values of phase voltages when the stator winding of the three-phase motor has a star connection, and the line currents into instantaneous values of phase currents when the stator winding of the three-phase motor has a delta connection. A "no-load phase voltage, phase current, and frequency storage unit" 6 has the function of causing the "phase voltage and phase current calculator" 4 to convert and calculate the instantaneous values of the voltages and the currents in the no-load state detected by the "line voltage, line current, and frequency detector" 2 first, and storing the obtained phase voltages and phase currents in the no-load state as data, and the function of storing the frequencies in the no-load state detected by the "line voltage, line current, and frequency detector" 2. The "phase voltage and phase current calculator" 4 has not only the calculation function but also the following function as a mode.

More specifically, the "phase voltage and phase current calculator" 4 also has the function of searching phase currents in the no-load state corresponding to the equal line voltages and the equal frequencies of the three-phase motor in the drive state through the "no-load phase voltage, phase current, and frequency storage unit" 6 in which data of phase voltages and phase currents related to the line voltages in the no-load state and the power supply frequency, causing the "phase voltage and phase current calculator" 4 to calculate and convert the instantaneous line voltages and the instantaneous line currents of the three-phase motor in the drive state detected by the "line voltage, line current, and frequency detector" 2 into instantaneous phase voltages and instantaneous phase currents, and subtracting the instantaneous phase currents searched through the "no-load phase voltage, phase current, and frequency storage unit" 6 from the calculated phase currents.

A method of calculating a high-precision instantaneously generated torque of the three-phase motor described in a fifth aspect of the present invention will be described below.

Instantaneous phase currents in the no-load state corresponding to line voltages and frequencies which are equal to those of the three-phase motor in the drive state are searched through the "no-load phase voltage, phase current, and frequency storage unit" 6 in which the data of the phase voltages and the phase currents related to the line voltages and the frequencies in the no-load state are stored, and the instantaneous line voltages and line currents of the three-phase motor in the drive state detected by the "line voltage, line current, and frequency detector" 2 are calculated by the "phase voltage and phase current calculator" 4 to be converted into instantaneous phase voltages and instantaneous phase currents. The instantaneous phase currents in the no-load state searched through the "no-load phase voltage, phase current, and frequency storage unit" 6 is subtracted from the calculated phase currents by the "phase voltage and phase current calculator" 4, and the phase currents subject to subtraction and phase voltages obtained at the phase currents are input to the "high-precision instantaneous torque calculator" 5. An instantaneous torque is calculated by one of torque operation expressions, i.e., equation (1), equation (5) and equation (6), so that a high-precision instantaneously generated torque is calculated.

Figure 3:
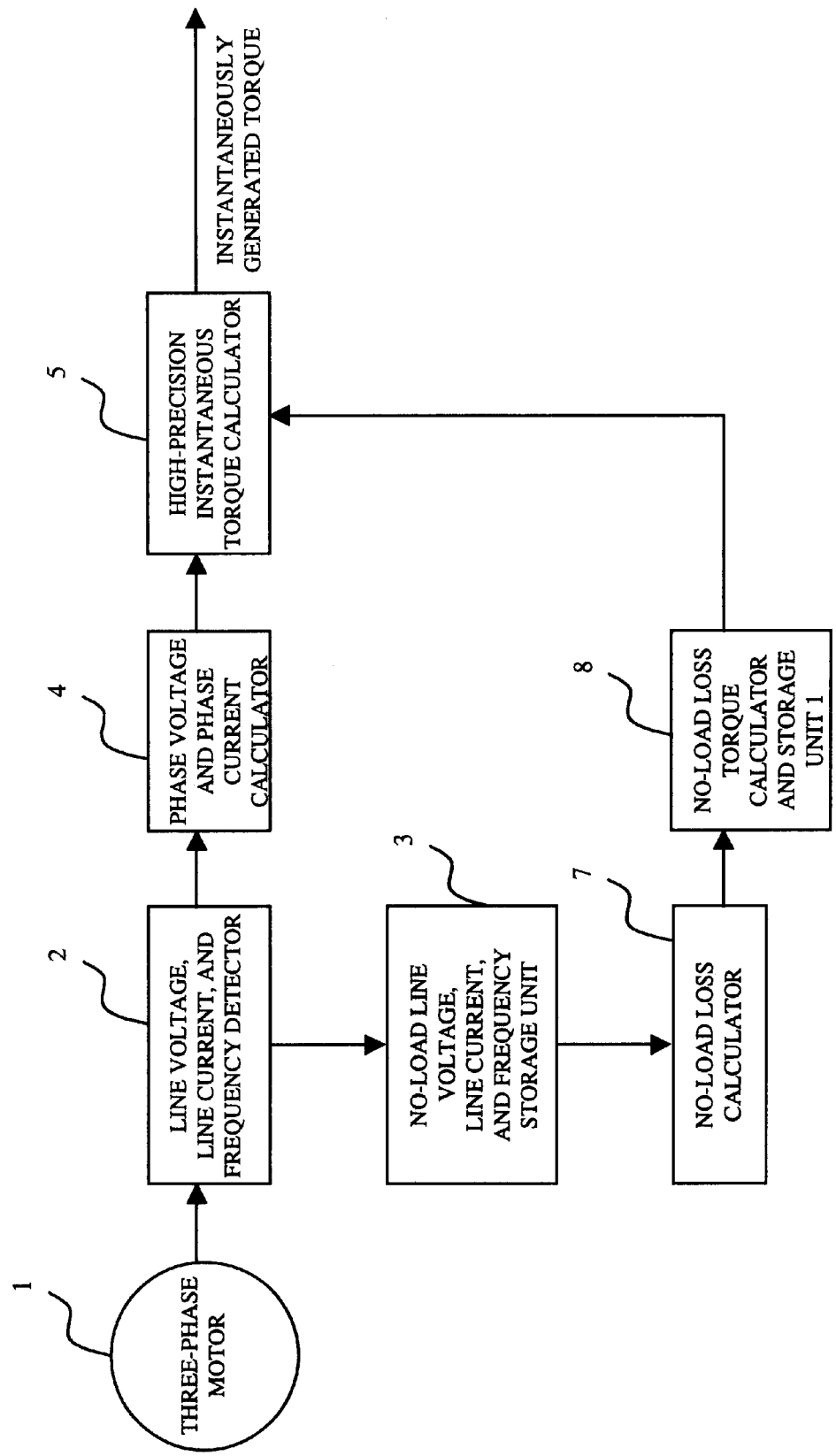
FIG. 3 is a diagram showing an embodiment of a high-precision instantaneously generated torque detection device for a three-phase motor according to a sixth aspect of the present invention.

FIG. 3 is a diagram according to a sixth aspect of the present invention. The instantaneous values of the line voltages and the line currents of the terminals of the three-phase motor 1, a power supply frequency $f_s$, and a rotation frequency $f_n$ of a rotor speed are detected by the "line voltage, line current, and frequency detector" 2. First, the instantaneous values of the line voltages in the no-load state and the line current in the no-load state, the power supply frequency $f_s$, and a rotation frequency $f_{n0}$ of the rotor speed in the no-load state are detected by the "line voltage, line current, and frequency detector" 2, and are stored in the "no-load line voltage, line current, and frequency storage unit" 3.

A "no-load loss calculator" 7 is a calculator which calculates an instantaneous no-load input $P_i$ from the line voltages and the line currents stored in the "no-load line voltage, line current, and frequency storage unit" 3, and subtracts an instantaneous copper loss Pc caused by winding resistances R of the phases of the stator winding from the no-load input $P_i$ to calculate an instantaneous no-load loss $P_0$. A "no-load loss torque calculator and storage unit 1" 8 calculates instantaneous loss torques $\tau_{01}$ in the no-load state from the frequencies detected from the "line voltage, line current, and frequency detector" 2 or the frequencies stored in the "no-load line voltage, line current, and frequency storage unit" 3 and the no-load loss $P_0$ calculated by the "no-load loss calculator" 7 to store the data. The "high-precision instantaneous torque calculator" 5 has the function of calculating an instantaneous torque by one of the torque operation expressions, i.e., equation (1), equation (5), and equation (6) from the instantaneous values of the phase voltages and the phase currents of the three-phase motor in the drive state calculated by the "phase voltage and phase current calculator" 4, and subtracting the instantaneous loss torques $\tau_{01}$ in the no-load state searched through the "no-load loss torque calculator and storage unit 1" 8 from the calculated torque.

A method of calculating a high-precision instantaneously generated torque of the three-phase motor described in a sixth aspect of the present invention will be described below.

Instantaneous loss torques in the no-load state corresponding to frequencies which are equal to those of equal line voltages of the three-phase motor in the drive state are searched through the "no-load loss torque calculator and storage unit 1" 8 in which data of the instantaneous loss torques in the no-load state related to the line voltages and the frequencies in the no-load state are stored, and the instantaneous line voltages and the instantaneous line currents of the three-phase motor in the drive state detected by the "line voltage, line current, and frequency detector" 2 are calculated by the "phase voltage and phase current calculator" 4 to be converted into instantaneous phase voltages and instantaneous phase currents. The calculated phase voltages and the phase currents are input to the "high-precision instantaneous torque calculator" 5, and an instantaneous torque is calculated by one of the torque operation expressions, i.e., equation (1), equation (5), and equation (6). The instantaneous loss torques $\tau_{01}$ in the no-load state searched through the "no-load loss torque calculator and storage unit 1" 8 are subtracted from the calculated torque by the "high-precision instantaneous torque calculator" 5, so that a high-precision instantaneously generated torque is calculated.

Figure 4:
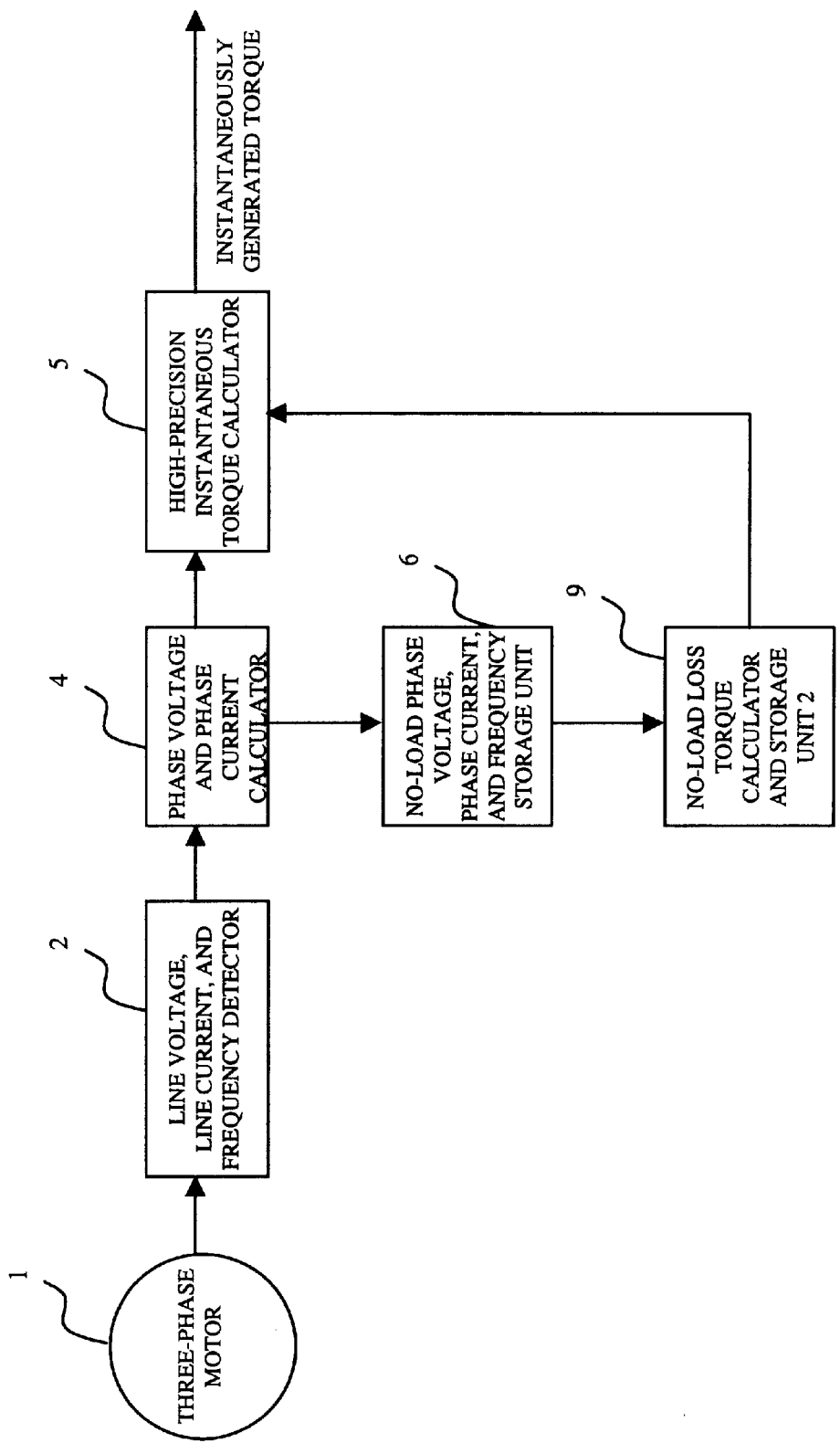
FIG. 4 is a diagram showing an embodiment of a high-precision instantaneously generated torque detection device for a three-phase motor according to a seventh aspect of the present invention.

FIG. 4 is a diagram according to a seventh aspect of the present invention. The instantaneous values of the line voltages and the line currents of the terminals of the three-phase motor 1, a power supply frequency $f_s$, and a rotation frequency $f_n$ of a rotor speed are detected by the "line voltage, line current, and frequency detector" 2.

The "phase voltage and phase current calculator" 4 is a calculator for converting, of the instantaneous line voltages and the instantaneous line currents from the "line voltage, line current, and frequency detector" 2, the line voltages into instantaneous values of phase voltages when the stator winding of the three-phase motor has a star connection, and the line currents into instantaneous values of phase currents when the stator winding of the three-phase motor has a delta connection. The "no-load phase voltage, phase current, and frequency storage unit" 6 has the function of causing the "phase voltage and phase current calculator" 4 to convert and calculate the instantaneous values of the voltages and the currents in the no-load state detected by the "line voltage, line current, and frequency detector" 2 first, and storing the obtained phase voltages and phase currents in the no-load state as data, and the function of storing the frequencies in the no-load state detected by the "line voltage, line current, and frequency detector" 2.

A "no-load loss torque calculator and storage unit 2" 9 serves as a calculator and a storage unit which perform torque calculation by one of equation (1), equation (5), and equation (6) from the instantaneous values of the phase voltages and the phase currents in the no-load state converted and calculated by the "phase voltage and phase current calculator" 4 or the instantaneous values of the phase voltages and the phase currents in the no-load state stored in the "no-load phase voltage, phase current, and frequency storage unit" 6, or which calculate a torque from the instantaneous values of the phase voltages and the phase currents and the frequencies stored in the "no-load phase voltage, phase current, and frequency storage unit" 6 to calculate instantaneous loss torques $\tau_{02}$ in the no-load state, and stores the data. The "high-precision instantaneous torque calculator" 5 has the function of calculating an instantaneous torque by one of equation (1), equation (5), and equation (6) from the instantaneous values of the phase voltages and the phase currents of the three-phase motor in the operation state calculated by the "phase voltage and phase current calculator" 4, and subtracting the instantaneous loss torques $\tau_{02}$ in the no-load state searched through the "no-load loss torque calculator and storage unit 2" 9 from the calculated torque.

A method of calculating a high-precision instantaneously generated torque of the three-phase motor described in the seventh aspect of the present invention will be described below.

Loss torques in the no-load state corresponding to frequencies which are equal to those of the equal line voltages of the three-phase motor in the drive state are searched through the "no-load loss torque calculator and storage unit 2" 9 in which the data of the instantaneous loss torques $\tau_{02}$ related to the line voltages and the frequencies in the no-load state, and the line voltages and the line currents of the three-phase motor in the drive state detected by the "line voltage, line current, and frequency detector" 2 are calculated by the "phase voltage and phase current calculator" 4 to be converted into instantaneous phase voltages and instantaneous phase currents. Instantaneous torques are calculated by the "high-precision instantaneous torque calculator" 5 from the calculated phase voltages and the calculated phase currents, and the instantaneous loss torques $\tau_{02}$ in the no-load state searched through the "no-load loss torque calculator and storage unit 2" 9 are subtracted from the calculated torque by the "high-precision instantaneous torque calculator" 5, so that a high-precision instantaneously generated torque is calculated.

Figure 5:
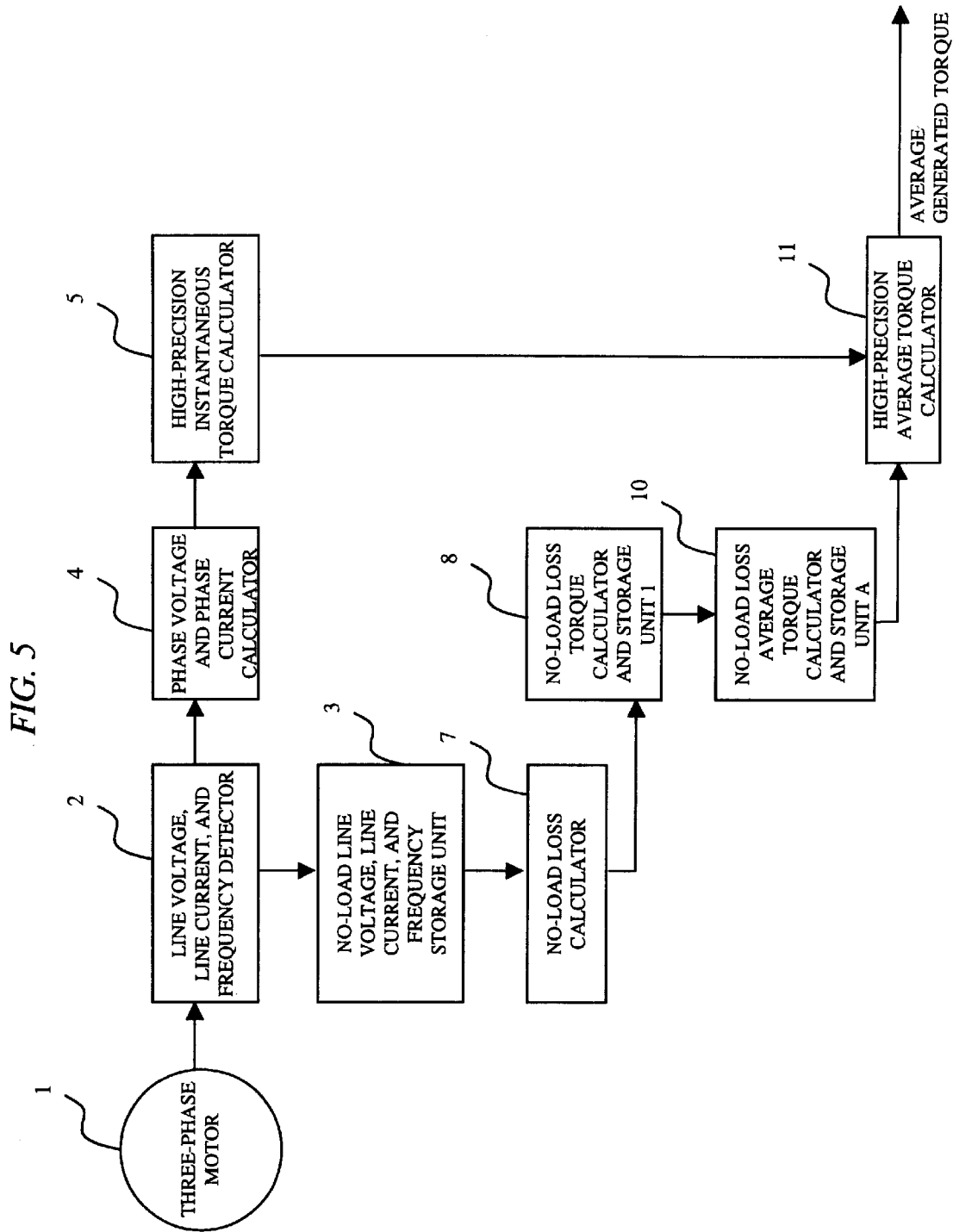
FIG. 5 is a diagram showing an embodiment of a high-precision instantaneously generated torque detection device for a three-phase motor according to an eighth aspect of the present invention.

FIG. 5 is a diagram according to an eighth aspect of the present invention. The instantaneous values of the line voltages and the line currents of the terminals of the three-phase motor 1, a power supply frequency $f_s$, and a rotation frequency $f_n$ of a rotor speed are detected by the "line voltage, line current, and frequency detector" 2. First, the instantaneous values of the line voltages in the no-load state and the line current in the no-load state, the power supply frequency $f_s$, and a rotation frequency $f_{n0}$ of the rotor speed are detected by the "line voltage, line current, and frequency detector" 2, and are stored in the "no-load line voltage, line current, and frequency storage unit" 3.

The "no-load loss calculator" 7 is a calculator which calculates an instantaneous no-load input Pi from the line voltages and the line currents stored in the "no-load line voltage, line current, and frequency storage unit" 3, and subtracts an instantaneous copper loss Pc caused by winding resistances R of the phases of the stator winding from the no-load input Pi to calculate an instantaneous no-load loss $P_0$. A "no-load loss torque calculator and storage unit 1" 8 calculates instantaneous loss torques $\tau_{01}$ in the no-load state from the frequencies detected from the "line voltage, line current, and frequency detector" 2 or the frequencies stored in the "no-load line voltage, line current, and frequency storage unit" 3 and the no-load loss $P_0$ calculated by the "no-load loss calculator" 7 to store the data. A "no-load loss average torque calculator and storage unit A" 10 has the function of averaging the instantaneous loss torques $\tau_{01}$ output from the "no-load loss torque calculator and storage unit 1" 8 with respect to time, and storing the data of an obtained average torque $\tau_{0A}$. Time used to average the torque is preferably set to be a period of time which can be sufficiently recognized and discriminated by the eyes of a person when the display changes into the next display, e.g., about 2 seconds.

A "high-precision average torque calculator" 11 has the function of causing the "phase voltage and phase current calculator" 4 to calculate the instantaneous values of the line voltages and the line currents of the three-phase motor in the drive state detected by the "line voltage, line current, and frequency detector" 2 and to convert the line voltages and the line currents into instantaneous phase voltages and instantaneous phase currents, calculating an instantaneous torque from the calculated phase voltages and the calculated phase currents by one of equation (1), equation (5), and equation (6) by means of the "high-precision instantaneous torque calculator" 5, and calculating an average torque with respect to time from one of the calculated instantaneous torques, and the function of subtracting the average torque $\tau_{0A}$ of the no-load loss stored in the "no-load loss average torque calculator and storage unit A" 10 from the calculated average torque.

A method of calculating a high-precision instantaneously generated torque of the three-phase motor described in the eighth aspect of the present invention will be described below.

An average torque of instantaneous no-load losses corresponding to frequencies which are equal to those of equal line voltages of the three-phase motor in the drive state is searched through the "no-load loss average torque calculator and storage unit A" 10 in which data of the average torque of instantaneous no-load losses related to the line voltages and the frequencies in the no-load state are stored, and the instantaneous line voltages and the instantaneous line currents of the three-phase motor in the drive state detected by the "line voltage, line current, and frequency detector" 2 are calculated by the "phase voltage and phase current calculator" 4 to be converted into instantaneous phase voltages and instantaneous phase currents. Instantaneous torques are calculated from the calculated phase voltages and the calculated phase currents by one of equation (1), equation (5), and equation (6) by means of the "high-precision instantaneous torque calculator" 5, and an average torque is calculated from the calculated instantaneous torques by the "high-precision average torque calculator" 11. An average torque $\tau_{OA}$ of the instantaneous no-load losses searched through the "no-load loss average torque calculator and storage unit A" 10 is subtracted from the calculated average torque, so that a high-precision average generated torque is calculated.

Figure 6:
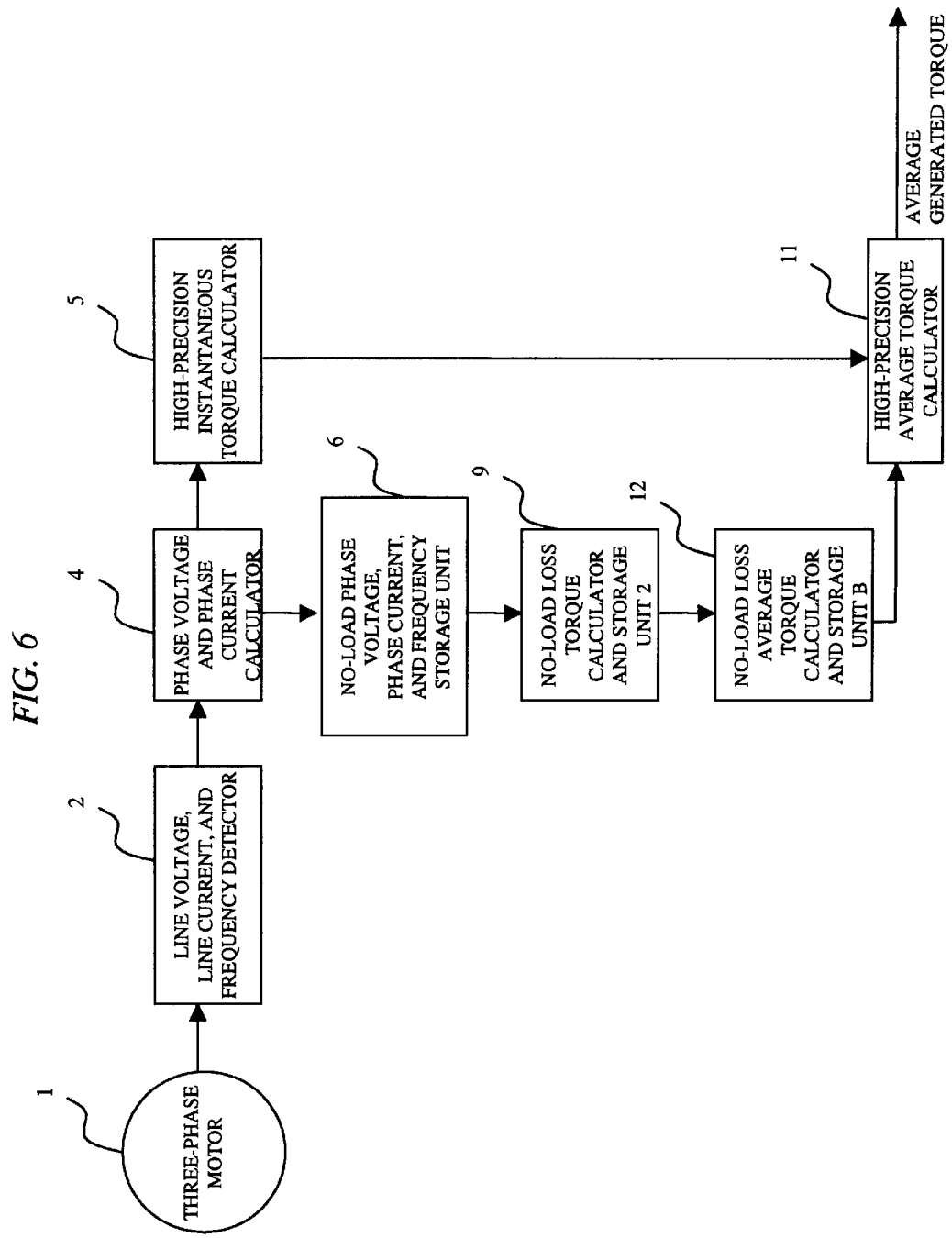
FIG. 6 is a diagram showing an embodiment of a high-precision instantaneously generated torque detection device for a three-phase motor according to a ninth aspect of the present invention.

FIG. 6 is a diagram for the ninth aspect of the present invention. The instantaneous values of the line voltages and the line currents of the terminals of the three-phase motor 1, a power supply frequency $f_s$, and a rotation frequency $f_n$ of a rotor speed are detected by the "line voltage, line current, and frequency detector" 2.

The "phase voltage and phase current calculator" 4 is a calculator for converting, of the instantaneous line voltages and the instantaneous line currents from the "line voltage, line current, and frequency detector" 2, the line voltages into instantaneous values of phase voltages when the stator winding of the three-phase motor has a star connection, and the line currents into instantaneous values of phase currents when the stator winding of the three-phase motor has a delta connection. The "no-load phase voltage, phase current, and frequency storage unit" 6 has the function of causing the "phase voltage and phase current calculator" 4 to convert and calculate the instantaneous values of the voltages and the currents in the no-load state detected by the "line voltage, line current, and frequency detector" 2 first, and storing the obtained phase voltages and phase currents in the no-load state as data, and the function of storing the frequencies in the no-load state detected by the "line voltage, line current, and frequency detector" 2.

The "no-load loss torque calculator and storage unit 2" 9 serves as a calculator and a storage unit which performs torque calculation by one of equation (1), equation (5), and equation (6) from the instantaneous values of the phase voltages and the phase currents in the no-load state converted and calculated by the "phase voltage and phase current calculator" 4 or the instantaneous values of the phase voltages and the phase currents in the no-load state stored in the "no-load phase voltage, phase current, and frequency storage unit" 6, or which calculates a torque from the instantaneous values of the phase voltages and the phase currents and the frequencies stored in the "no-load phase voltage, phase current, and frequency storage unit" 6 to calculate instantaneous loss torques $\tau_{o2}$ in the no-load state, and stores the data. A "no-load loss average torque calculator and storage unit B" 12 has the function of averaging the instantaneous loss torques $\tau_{o2}$ in the no-load state output from the "no-load loss torque calculator and storage unit 2" 9 with respect to time, and storing average torque data $\tau_{OB}$ of the average torque.

The "high-precision average torque calculator" 11 has the function of causing the "phase voltage and phase current calculator" 4 to calculate the instantaneous values of the line voltages and the line currents of the three-phase motor in the drive state detected by the "line voltage, line current, and frequency detector" 2 and to convert the line voltages and the line currents into instantaneous phase voltages and instantaneous phase currents, calculating instantaneous torques from the calculated phase voltages and the calculated phase currents by one of equation (1), equation (5), and equation (6) by means of the "high-precision instantaneous torque calculator" 5, and calculating an average torque with respect to time from one of the calculated instantaneous torques, and the function of subtracting the average torque $\tau_{OB}$ of the no-load loss stored in the "no-load loss average torque calculator and storage unit B" 12 from the calculated average torque.

A method of calculating a high-precision instantaneously generated torque of the three-phase motor described in the ninth aspect of the present invention will be described below.

An average torque of instantaneous no-load losses corresponding to frequencies which are equal to those of equal line voltages of the three-phase motor in the drive state is searched through the "no-load loss average torque calculator and storage unit B" 12 in which data of the average torque of instantaneous no-load losses related to the line voltages and the line currents in the no-load state are stored, and the instantaneous line voltages and the instantaneous line currents of the three-phase motor in the drive state detected by the "line voltage, line current, and frequency detector" 2 are calculated by the "phase voltage and phase current calculator" 4 to be converted into instantaneous phase voltages and instantaneous phase currents. Instantaneous torques are calculated from the calculated phase voltages and the calculated phase currents by one of equation (1), equation (5), and equation (6) by means of the "high-precision instantaneous torque calculator" 5, and an average torque is calculated from the calculated instantaneous torques by the "high-precision average torque calculator" 11. An average torque $\tau_{OB}$ of the instantaneous no-load losses searched through the "no-load loss average torque calculator and storage unit B" 12 is subtracted from the calculated average torque, so that a high-precision average generated torque is calculated.

As has been described above, in a high-precision instantaneously generated torque detection device for a three-phase motor according to the present invention, before an instantaneously generated torque is calculated from instantaneous values of an applied voltage and a current of the three-phase motor, storage of an instantaneous current in a no-load state, calculation and storage of an instantaneous loss torque in the no-load state, or calculation and storage of an average torque of no-load losses based on the instantaneous loss torque in the no-load state are performed in advance. When an instantaneously generated torque is calculated from the instantaneous values of the voltages and the currents of the three-phase motor in the drive state, a high-precision instantaneously generated torque can be detected in consideration of the stored no-load current or the loss torque in the no-load state, and a high-precision average generated torque can be detected in consideration of an average loss torque in the no-load state.

What is claimed is:

1. A high-precision instantaneously generated torque detection device for a three-phase motor comprising a calculator in which, before an instantaneously generated torque is calculated from the instantaneous values of an applied voltage and a current of the three-phase motor, a no-load current which is not contributed to the torque is detected in advance, the instantaneous value of the no-load current is subtracted from the instantaneous current detected by the three-phase motor in a drive state, and a high-precision instantaneously generated torque is calculated.

2. A high-precision instantaneously generated torque detection device for a three-phase motor comprising a calculator in which, before an instantaneously generated torque is calculated from the instantaneous values of an applied voltage and a current of the three-phase motor, a no-load current which is not contributed to the torque is detected in advance, an instantaneous no-load loss torque corresponding to the no-load current is calculated, the no-load loss torque is subtracted from the value of an instantaneously generated torque calculated from the instantaneous values of the applied voltage and the current detected from the three-phase motor in a drive state, and a high-precision instantaneously generated torque is calculated.

3. An high-precision instantaneously generated torque detection device for a three-phase motor according to claim 1, comprising a "line voltage, line current, and frequency detector" for detecting the instantaneous values of line voltages and line currents of the three-phase motor and frequencies and a "no-load line voltage, line current, and frequency storage unit" for performing data storage of the instantaneous line voltages and the instantaneous line currents and the frequencies in a no-load state detected by the "line voltage, line current, and frequency detector", wherein instantaneous line currents in the no-load state corresponding to frequencies which are equal to those of the equal line voltages of the three-phase motor in a drive state is searched through the "no-load line voltage, line current, and frequency storage unit" in which data of line currents related to line voltages and frequencies in the no-load state are stored, the instantaneous line currents in the no-load state searched through the "no-load line voltage, line current, and frequency storage unit" are subtracted from the instantaneous line currents of the three-phase motor in the drive state detected by the "line voltage, line current, and frequency detector" also having the function of subtracting the instantaneous line currents in the no-load state searched through the "no-load line voltage, line current, and frequency storage unit", the line voltages and the line currents output from the "line voltage, line current, and frequency detector" are calculated by the "phase voltage and phase current calculator" to be converted into phase voltages and phase currents, and a high-precision instantaneously generated torque is obtained from the calculated phase voltages and the calculated phase currents by a "high-precision instantaneous torque calculator".

4. A high-precision instantaneously generated torque detection device for a three-phase motor according to claim 1, comprising a "no-load phase voltage, phase current, and frequency storage unit" for performing data storage of phase voltages and phase currents in a no-load state calculated by a "phase voltage and phase current calculator" for calculating line voltages and line currents detected by a "line voltage, line current, and frequency detector" to convert the line voltage and the line currents into phase voltages and phase currents, and performing data storage of frequencies detected by the "line voltage, line current, and frequency detector", wherein instantaneous phase currents in the no-load state corresponding to frequencies which are equal to those of equal line voltages of the three-phase motor in the drive state are searched through the "no-load phase voltage, phase current, and frequency storage unit" in which the data of the phase voltages and the phase currents related to line voltages and frequencies in the no-load state are stored, the line voltages and line currents of the three-phase motor in the drive state detected by the "line voltage, line current, and frequency detector" are calculated by the "phase voltage and phase current calculator" to be converted into instantaneous phase voltages and instantaneous phase currents, the instantaneous phase currents in the no-load state searched through the "no-load phase voltage, phase current, and frequency storage unit" is subtracted from the calculated phase currents by the "phase voltage and phase current calculator" further including the function of subtracting the instantaneous phase currents searched through the "no-load phase voltage, phase current, and frequency storage unit", and a high-precision instantaneously generated torque is obtained by a "high-precision instantaneous torque calculator" from the phase currents and the phase voltages subjected to subtraction.

5. A high-precision instantaneously generated torque detection device for a three-phase motor according to claim 2, comprising a "no-load loss calculator" for calculating an instantaneous no-load loss from line voltages and line currents in a no-load state detected by a "line voltage, line current, and frequency detector" or line voltages and line currents in a no-load state stored in a "no-load line voltage, line current, and frequency storage unit", and a "no-load loss torque calculator and storage unit 1" for calculating an instantaneous loss torque in the no-load state from a no-load loss calculated by a "no-load loss calculator" and frequencies detected by the "line voltage, line current, and frequency detector" or frequencies searched through the "no-load line voltage, line current, and frequency storage unit" to store the data, wherein instantaneous loss torques in the no-load state corresponding to frequencies which are equal to those of equal line voltages of the three-phase motor in the drive state are searched through the "no-load loss torque calculator and storage unit 1" in which data of the instantaneous loss torques in the no-load state related to line voltages and frequencies in the no-load state are stored, the instantaneous line voltages and the instantaneous line currents of the three-phase motor in the drive state detected by the "line voltage, line current, and frequency detector" are calculated by the "phase voltage and phase current calculator" to be converted into instantaneous phase voltages and instantaneous phase currents, instantaneous torques are calculated from the calculated phase voltages and the calculated phase currents by a "high-precision instantaneous torque calculator", the instantaneous loss torques in the no-load state searched through the "no-load loss torque calculator and storage unit 1" are subtracted from the calculated torque by the "high-precision instantaneous torque calculator" further including the function of subtracting the instantaneous loss torques in the no-load state searched through the "no-load loss torque calculator and storage unit 1", and a high-precision instantaneously generated torque is obtained.

6. A high-precision instantaneously generated torque detection device for a three-phase motor according to claim 2, comprising a "no-load loss torque calculator and storage unit 2" for calculating instantaneous loss torques in a no-load state from phase voltages and phase currents converted and calculated by a "phase voltage and phase current calculator" from line voltages and line currents in the no-load state detected by a "line voltage, line current, and frequency detector" or phase voltages and phase currents in the no-load state stored in a "no-load line voltage, line current, and frequency storage unit" to store the data of the instantaneous loss torques, wherein instantaneous loss torques in the no-load state corresponding to frequencies which are equal to those of the equal line voltages of the three-phase motor in the drive state are searched through the "no-load loss torque calculator and storage unit 2" in which the data of the instantaneous loss torques calculated from the phase voltages and the phase currents related to line voltages and frequencies in the no-load state, the line voltages and the line currents of the three-phase motor in the drive state detected by the "line voltage, line current, and frequency detector" are calculated by the "phase voltage and phase current calculator" to be converted into instantaneous phase voltages and instantaneous phase currents, instantaneous torques are calculated from the calculated phase voltages and the calculated phase currents by a "high-precision instantaneous torque calculator", the instantaneous loss torques in the no-load state searched through the "no-load loss torque calculator and storage unit 2" are subtracted from the calculated torque by the "high-precision instantaneous torque calculator" further including the function of subtracting the instantaneous loss torques searched through the "no-load loss torque calculator and storage unit 2", and a high-precision instantaneously generated torque is obtained.

7. A high-precision instantaneously generated torque detection device for a three-phase motor, comprising a "no-load loss average torque calculator and storage unit A" for averaging instantaneous no-load loss torques output from a "no-load loss torque calculator and storage unit 1" with respect to time and storing the average torque, wherein an average torque of instantaneous no-load losses corresponding to frequencies which are equal to those of equal line voltages of the three-phase motor in the drive state is searched through the "no-load loss average torque calculator and storage unit A" in which data of the average torque of instantaneous no-load losses related to line voltages and frequencies in the no-load state are stored, the instantaneous line voltages and the instantaneous line currents of the three-phase motor in the drive state detected by a "line voltage, line current, and frequency detector" are calculated by a "phase voltage and phase current calculator" to be converted into phase voltages and phase currents, instantaneous torques are calculated from the calculated instantaneous phase voltages and the calculated instantaneous phase currents by a "high-precision instantaneous torque calculator", an average torque with respect to time is calculated from the calculated torques by the "high-precision average torque calculator", the average torque of the instantaneous no-load losses searched through the "no-load loss average torque calculator and storage unit A" is subtracted from the calculated average torque by the "high-precision average torque calculator" further including the function of subtracting the average torque of the instantaneous no-load losses searched through the "no-load loss average torque calculator and storage unit A", and a high-precision average generated torque calculated according to claim 3 is obtained.

8. A high-precision instantaneously generated torque detection device for a three-phase motor, comprising a "no-load loss average torque calculator and storage unit B" for averaging instantaneous no-load loss torques output from a "no-load loss torque calculator and storage unit 2" with respect to time and storing the average torque, wherein an average torque of instantaneous no-load losses corresponding to frequencies which are equal to those of equal line voltages of the three-phase motor in the drive state is searched through the "no-load loss average torque calculator and storage unit B" in which data of the average torque of instantaneous no-load losses related to line voltages and frequencies in the no-load state are stored, the instantaneous line voltages and the instantaneous line currents of the three-phase motor in the drive state detected by a "line voltage, line current, and frequency detector" are calculated by a "phase voltage and phase current calculator" to be converted into phase voltages and phase currents, instantaneous torques are calculated from the calculated instantaneous phase voltages and the calculated instantaneous phase currents by a "high-precision instantaneous torque calculator", an average torque with respect to time is calculated from the calculated torques by the "high-precision average torque calculator", the average torque of the instantaneous no-load losses searched through the "no-load loss average torque calculator and storage unit B" is subtracted from the calculated average torque by the "high-precision average torque calculator" further including the function of subtracting the average torque of the instantaneous no-load losses searched through the "no-load loss average torque calculator and storage unit B", and a high-precision average generated torque calculated according to claim 3 is obtained.

* * * * *